United States Patent
Allut et al.

(10) Patent No.: US 9,752,533 B2
(45) Date of Patent: Sep. 5, 2017

(54) METHOD FOR MONITORING A LOCKING SYSTEM

(71) Applicant: SNECMA, Paris (FR)

(72) Inventors: Gabriel Allut, Paris (FR); Mohamed Bozetine, Palaiseau (FR); Antoine Olivier François Colin, Nantes (FR); Barbara-Ann Piquet, Alfortville (FR)

(73) Assignee: SNECMA, Paris (FR)

( * ) Notice: Subject to any disclaimer, the term of this patent is extended or adjusted under 35 U.S.C. 154(b) by 0 days.

(21) Appl. No.: 15/029,434

(22) PCT Filed: Oct. 16, 2014

(86) PCT No.: PCT/FR2014/052636
§ 371 (c)(1),
(2) Date: Apr. 14, 2016

(87) PCT Pub. No.: WO2015/055957
PCT Pub. Date: Apr. 23, 2015

(65) Prior Publication Data
US 2016/0252050 A1 Sep. 1, 2016

(30) Foreign Application Priority Data
Oct. 18, 2013 (FR) ...................................... 13 60169

(51) Int. Cl.
*F02K 1/76* (2006.01)
*F02K 1/64* (2006.01)

(52) U.S. Cl.
CPC ................ *F02K 1/766* (2013.01); *F02K 1/64* (2013.01); *F02K 1/76* (2013.01)

(58) Field of Classification Search
CPC ............... F02K 1/766; F02K 1/64; F02K 1/76
(Continued)

(56) References Cited

U.S. PATENT DOCUMENTS 5,513,561 A * 5/1996 Biliskov, Jr. .......... B30B 15/287
100/282
6,148,607 A * 11/2000 Baudu ..................... F02K 1/766
239/265.17
(Continued)

FOREIGN PATENT DOCUMENTS

EP 1 413 735 A1 4/2004
FR 2 928 681 A1 9/2009
FR 2 978 801 A1 2/2013

OTHER PUBLICATIONS

International Preliminary Report on Patentability and the Written Opinion of the International Searching Authority as issued in International Patent Application No. PCT/FR2014/052636, dated Apr. 19, 2016.
(Continued)

*Primary Examiner* — Yong Hang Jiang
(74) *Attorney, Agent, or Firm* — Pillsbury Winthrop Shaw Pittman LLP

(57) ABSTRACT

A method for monitoring a locking system includes N locks, each lock being monitored by two locking sensors, each locking sensor being capable of indicating if the lock that it monitors is in a locked or unlocked state, each locking sensor being able to be in a valid or invalid status, the method including determining the state of the locking system on the basis of the state of the locks detected by the locking sensors; determining a reliability level associated with the state of the locking system on the basis of the number of valid locking sensors monitoring the locks that are in the same state as the locking system.

11 Claims, 1 Drawing Sheet

(58) Field of Classification Search
USPC .......................................... 340/3.1, 3.43, 3.8
See application file for complete search history.

(56) References Cited

U.S. PATENT DOCUMENTS 6,157,887 A * 12/2000 Zittlau .................... B60T 7/042
303/122.03
7,521,818 B2 * 4/2009 Bergmann .............. E05B 81/78
307/10.2

OTHER PUBLICATIONS

International Search Report as issued in International Patent Application No. PCT/FR2014/052636, dated Jan. 27, 2015.

* cited by examiner

METHOD FOR MONITORING A LOCKING SYSTEM

CROSS-REFERENCE TO RELATED APPLICATIONS

This is the U.S. National Stage of PCT/FR2014/052636, filed Oct. 16, 2014, which in turn claims priority to French Patent Application No. 1360169, filed Oct. 18, 2013, the entire contents of all applications are incorporated herein by reference in their entireties.

TECHNICAL FIELD

The present invention relates to a method for monitoring a locking system, and more precisely, a method for monitoring a locking system of a thrust reverser for turbine engine.

STATE OF THE PRIOR ART

Turbine engines are conventionally equipped with thrust reversers that make it possible to orient forward the thrust exerted by the turbine engine in order to brake the airplane, which notably makes it possible to reduce braking distances during landing.

In flight, the thrust reverser must be locked. On the other hand, during landing, the thrust reverser must be able to be deployed. In order to avoid any risk of untimely deployment of the thrust reverser in flight, the thrust reverser is generally locked by a locking system comprising three locks, each lock being commanded independently. In order to improve safety, the state of each lock is generally monitored by two locking sensors which indicate to the engine control unit if the lock is locked or unlocked. The engine control unit thus receives a large number of information items and it is sometimes difficult for it to identify if said information items are reliable or not.

DESCRIPTION OF THE INVENTION

The invention aims to overcome the drawbacks of the prior art by proposing a method for monitoring a locking system and notably a locking system of a turbine engine reverser that gives not only information items on the locking state of the system, but also on the reliability of the information items that it supplies.

To do so, the invention proposes a method for monitoring the locking state of a system, and which also indicates a confidence level associated with this information.

More precisely, a first aspect of the invention relates to a method for monitoring a locking system comprising N locks, each lock being monitored by two locking sensors, each locking sensor being capable of indicating if the lock that it monitors is in a locked or unlocked state, each locking sensor being able to be in a valid or invalid status, the method comprising the following steps:
  Determining the state of the locking system on the basis of the state of the locks detected by the locking sensors;
  Determining a confidence level associated with the state of the locking system on the basis of the number of valid locking sensors monitoring the locks that are in the same state as the locking system.

"State" of a locking sensor designates the information that it provides on the locking state of the lock detected. Thus, in nominal mode, a locking sensor is in a locked state when the lock that it detects is locked and in an unlocked state when the lock that it detects is unlocked.

"Status" of a locking sensor designates the information on its validity. Thus, the "status" of a locking sensor may be valid when said locking sensor is valid or invalid when said locking sensor is invalid.

"Overall state" of a lock or the locking system designates the information on its locking. Thus, a lock is in an overall locked state when said lock is locked and in an overall unlocked state when said lock is unlocked.

"Status" of a lock designates the information on the validity of the information items that have served to determine its overall state.

Thus, the method for monitoring makes it possible to indicate what confidence level may be attributed to the information regarding the state of the locking system. This method is particularly advantageous when the number of locks is large because in this case the monitoring devices receive a large number of information items on the state of the locking sensors and it is difficult for them to know if the information resulting therefrom is reliable or not.

The method according to the invention may also have one or more of the following characteristics taken independently or according to any technically possible combinations thereof.

Advantageously, the step of determining the state of the locking system comprises the following steps:
  Acquisition of the status and the state of each locking sensor by the control unit;
  Determining the overall state and the status of each lock on the basis of the status and the state of the two locking sensors that monitor it;
  Determining the state of the locking system on the basis of the overall state of each lock.

Thus, to determine the state of the locking system, firstly the overall state of each lock is determined from the information items given by each of the locking sensors that monitor it and from the status of these locking sensors. The fact of taking into account the validity of the locking sensors in determining the overall state of the locks makes it possible to improve the reliability of the data obtained.

Advantageously, the method further comprises, following the step of determining the overall state and the status of each lock on the basis of the status and the state of the two locking sensors that monitor it, a step of associating a confidence index with the overall state.

According to several embodiments of the invention, taken independently or according to any technically possible combinations thereof:
  only the states of locking sensors for which the status is valid are used to determine the overall state of a lock;
  when the statuses of two locking sensors that monitor a same lock are invalid, an overall unlocked state is attributed to this lock and its status is considered invalid;
  when the statuses of two locking sensors that monitor a same lock are valid but that they detect states for this lock that are different, an overall unlocked state is attributed to this lock and its status is considered invalid.

More precisely, the following states are preferably attributed as overall state to each lock:
  If the two locking sensors that monitor a lock are valid and that they detect the same state for this lock, then the state given by the two locking sensors is attributed as overall state to this lock;

If the two locking sensors that monitor a lock are valid but that they do not detect the same state for this lock, then it is considered that these locking sensors are invalid and it is considered that this lock is in an overall unlocked state;

If one of the locking sensors that monitors a lock is valid and that the other locking sensor that monitors said lock is invalid, then the state detected by the valid locking sensor is attributed as overall state to this lock;

If the two locking sensors that monitor a lock are invalid, then it is considered that this lock is unlocked.

Advantageously, the method further comprises a step of determining a confidence index associated with the overall state of each lock, the confidence index being equal to the number of valid locking sensors that detect a state for the lock complying with the overall state of the lock. Thus:

If the two locking sensors that monitor a lock are valid and that they detect the same state for this lock, then the state detected by the two locking sensors is attributed as overall state to this lock, and the confidence index associated with this overall state is equal to 2;

If the two locking sensors that monitor a lock are valid but that they do not detect the same state for this lock, then it is considered that these locking sensors are invalid. It is then considered that this lock is in an overall unlocked state and the confidence index associated with this overall state is equal to 0;

If one of the locking sensors that monitors a lock is valid and that the other locking sensor that monitors this lock is invalid, then the state detected by the valid locking sensor is attributed as overall state to said lock and the confidence index associated with this overall state is equal to 1;

If the two locking sensors that monitor a lock are invalid, then it is considered that this lock is unlocked and the confidence index associated with this state is equal to 0.

Thus, the confidence level preferably corresponds to the number of sensors that can be believed to determine the state of the lock.

According to a preferential embodiment, the confidence level is determined by adding together the confidence indices associated with the overall states of the locks that are in the same overall state as the locking system.

Advantageously, the method further comprises:
a step of comparing the confidence level with a threshold level;
a step of associating a confidence level with the state of the locking system. If the confidence level is above the threshold level, then the reliability level is a high level reliability. If the confidence level is below the threshold level then the reliability level is a low level.

Advantageously, the state of the locking system is determined according to at least one of the following criteria:
it is considered that the locking system is in a locked state when at least P locks are in an overall locked state;
it is considered that the locking system is in an unlocked state when at least Q locks are in an overall unlocked state.

Advantageously, the locking system makes it possible to prevent the displacement of a moveable device, which is preferably a thrust reverser. The displacement of said device may be measured using at least one position sensor, preferably two position sensors.

Advantageously, the method further comprises the following steps:
determining the position of the moveable device using the position sensor;
comparing the position of the moveable device with the locking state of the locking system.

Another aspect of the invention relates to the use of the method for monitoring according to the first aspect of the invention for monitoring a locking system of a thrust reverser for turbine engine.

Another aspect of the invention relates to a monitoring device of a locking system comprising N locks, the monitoring device comprising means for the implementation of a method according to the first aspect of the invention.

This monitoring device preferably comprises:
at least 2N locking sensors, the locking sensors being laid out so that each lock is monitored by two locking sensors;
detection means capable of detecting the status of each locking sensor;
calculation means capable of determining the state of the locking system and an associated confidence level from data of the locking sensors and detection means.

BRIEF DESCRIPTION OF THE FIGURES

Other characteristics and advantages of the invention will become clear from reading the detailed description that follows, with reference to the appended figures, which illustrate.

For greater clarity, identical or similar elements are marked by identical reference signs in all of the figures.

DETAILED DESCRIPTION OF AT LEAST ONE EMBODIMENT

Figure 1:
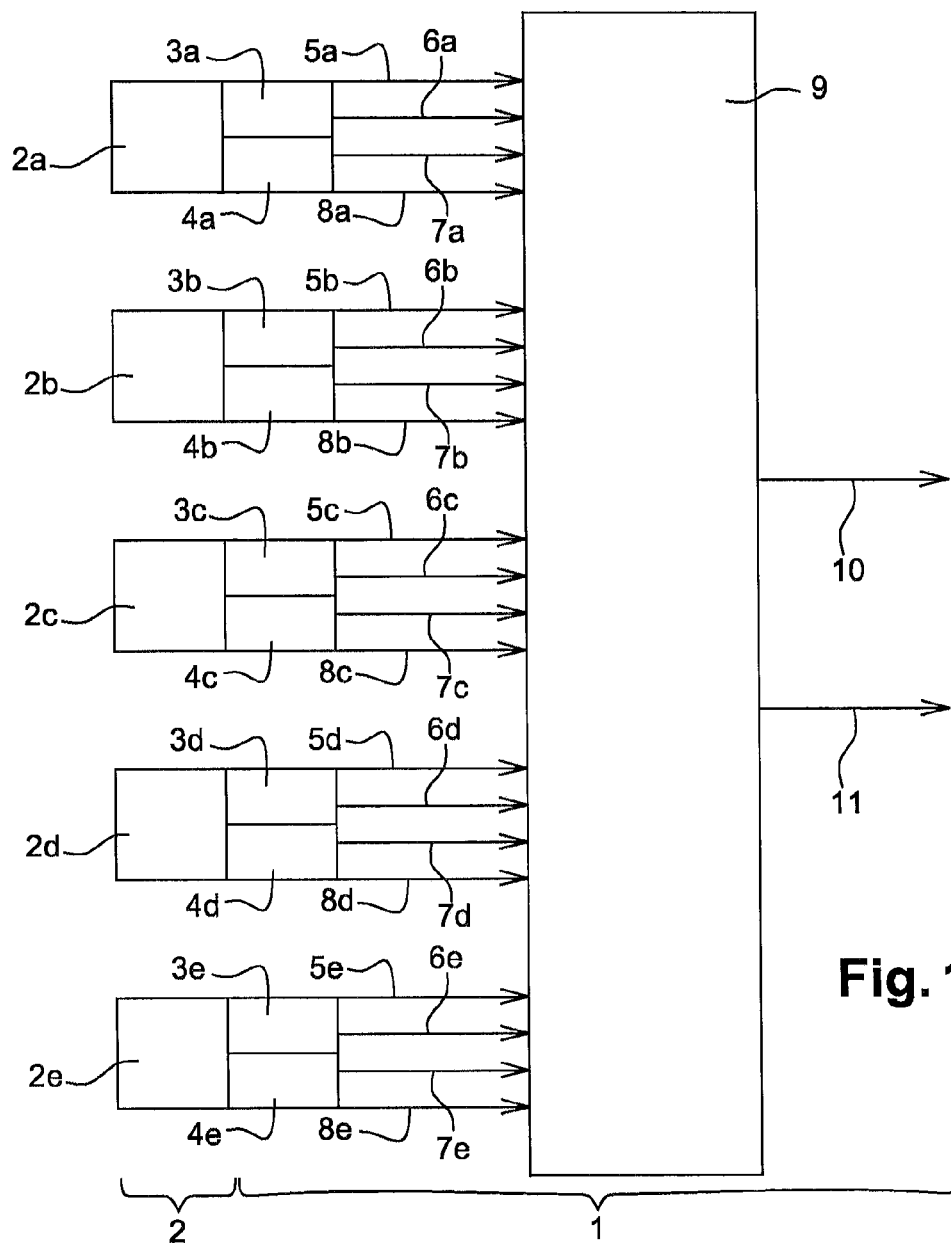
FIG. 1, a schematic representation of a monitoring device according to an embodiment of the invention.
Figure 2:
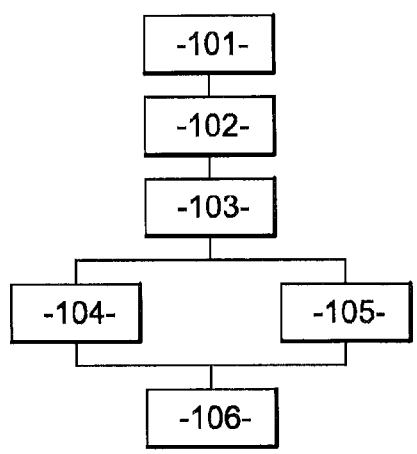
FIG. 2, a schematic representation of the steps of a method for monitoring according to an embodiment of the invention.

FIG. 1 represents a locking system 2 and a monitoring device 1 implementing a method for monitoring according to an embodiment of the invention. Said locking system 2 makes it possible to lock a thrust reverser of a turbine engine (not represented). To do so, the locking system 2 comprises five locks 2a, 2b, 2c, 2d, 2e. Each lock may be placed in a locked state or in an unlocked state. When the locking system operates normally, it is in a locked state when all the locks are in a locked state and in an unlocked state when all the locks are in an unlocked state. When the locking system is locked, it prevents the deployment of the thrust reverser. When the locking system is unlocked, it does not prevent the deployment of the thrust reverser. The locks are commanded by the engine control unit or FADEC and by the airplane. This control unit makes it possible to command the locking and the unlocking of the locks.

The monitoring device 1 makes it possible to monitor that the locking system is in a state conforming to the command of the engine control unit, that it to say that the locking system is indeed locked when the engine control unit commands it to be so and that the locking system is indeed unlocked when the engine control unit commands it to be so.

In this embodiment, in which the locking system comprises five locks, it is considered that the locking system is in a locked state when at least P locks are locked, with P equal to 3 and it is considered that the locking system is in an unlocked state when at least Q locks are unlocked, with Q equal to 3. Consequently, in this embodiment, the locking system is considered as locked when more than half of the locks are locked and the locking system is considered as unlocked when more than half of the locks are unlocked.

Each lock 2a, 2b, 2c, 2d, 2e is monitored by two locking sensors respectively 3a, 4a, 3b, 4b, 3c, 4c, 3d, 4d, 3e, 4e. "Status" of one of the locking sensors designates the fact that this sensor is valid or invalid. Through misuse of language, a locking sensor is designated as locked when it detects that the lock that it monitors is locked and that a locking sensor is unlocked when it detects that the lock that it monitors is unlocked. In this embodiment, a locking sensor is valid when it receives an excitation current coming from the engine control unit and that the electrical tests carried out on the signals do not reveal any breakdown of the sensor. In this case, the locking sensor is capable of detecting if the lock that it monitors is locked or unlocked. On the other hand, when the locking sensor does not receive any current or when the electrical tests carried out by the control unit on the output signals of the sensor reveal a breakdown of this sensor, it is not in working order and is not capable of detecting if the lock that it monitors is locked or unlocked: its status is thus considered as invalid.

The monitoring device according to the invention thus comprises detection means capable of determining if each locking sensor is operating nominally or instead if it has broken down. Consequently, these detection means are capable of determining if each locking sensor is in a valid or invalid status. These detection means thus transmit data 6a, 8a, 6b, 8b, 6c, 8c, 6d, 8d, 6e, 8e to the engine control unit on the status of each of the locking sensors 3a, 4a, 3b, 4b, 3c, 4c, 3d, 4d, 3e, 4e.

Furthermore, each locking sensor 3a, 4a, 3b, 4b, 3c, 4c, 3d, 4d, 3e, 4e probes one of the locks 2a, 2b, 2c, 2d, 2e so as to detect if said lock is in a locked or unlocked state. Normally, when the locking sensors are valid, they detect that the locks are locked when they are effectively locked and they detect that the locks are unlocked when they are effectively unlocked. Nevertheless, when a locking sensor is invalid, it may indicate that a lock is unlocked whereas said lock is locked.

To overcome this problem, the method for monitoring proposes taking into account the status of the locking sensors to determine the state of the locks and thus the locking system. Moreover, since the locking system comprises a large number of locks, the information on its locking or its unlocking takes into account a large number of locking sensors. It may thus be difficult to know if confidence can be placed in an information item coming from a large number of locking sensors. To overcome this problem, the method for monitoring according to the invention proposes associating with the information on the state of the locking system a confidence level that indicates to what extent confidence may be placed in the information on the state of the locking system. This confidence level makes it possible to take into account the number of locking sensors that detect a state for the locks in agreement with the state of the locking system.

To do so, the method according to the invention comprises the steps described hereafter.

The method comprises a step 101 of detecting the status of each locking sensor 3a, 4a, 3b, 4b, 3c, 4c, 3d, 4d, 3e, 4e using the detection means. These detection means are implemented by the engine control unit which assures that there is no detectable breakdown of the locking sensors. The information 5a, 7a, 5b, 7b, 5c, 7c, 7d, 7d, 5e, 7e on the status of the locking sensors is then sent to the application software of the engine control unit 9.

The method also comprises a step 102 of detecting the state of each lock 2a, 2b, 2c, 2d, 2e by means of each of the locking sensors 3a, 4a, 3b, 4b, 3c, 4c, 3d, 4d, 3e, 4e.

The method then comprises a step 103 of determining an overall state of each lock and an associated confidence index on the basis:

Of the status of the two sensors that monitor it;
Of the state of the lock detected by each of these sensors.
More precisely, the overall state of each lock and the associated confidence index are determined in the following manner:

when the two sensors are valid and when they detect that the lock is in a state, this state is attributed as overall state to the lock and as associated confidence index a maximum confidence index equal to 2 is attributed;

when the two sensors are valid, but when they do not detect the same state for the lock, then it is considered that this lock is in an overall unlocked state and this overall state is associated with a confidence index equal to 0;

when the two sensors are invalid, the unlocked state is attributed as overall state to the lock and 0 as confidence index;

when one of the sensors is valid and the other invalid, the state given by the valid sensor is attributed as overall state to the lock and 1 as confidence index.

The method then comprises a step 104 of determining the state of the locking system 1 on the basis of the overall states of the locks. Thus, if at least three locks are in the locked state, the state of the locking system is locked whereas if at least three locks are in the unlocked state, the state of the locking system is unlocked.

The method also comprises a step 105 of determining a confidence level associated with this state. This confidence level is calculated by adding together the confidence indices associated with the states of the locks that are in the same state as the locking system. For example if the lock 2a is in a locked state with a confidence index of 2, that the lock 2b is in a locked state with a confidence index of 1, that the lock 2c is in a locked state with a confidence index of 1, and that the other locks are unlocked, then the locking system will be considered as locked with a confidence level of 4.

The method may then comprise a step 106 of comparing the confidence level with a threshold level. In this embodiment comprising five locks, the threshold level may be equal to 6. If the confidence level is above the threshold level, it is considered that the information on the state of the locking system is very reliable. Otherwise, it is considered that this information is unreliable.

The monitoring device may also comprise position sensors capable of detecting the position of the thrust reverser. The method may then comprise a step of comparing the state of the locking system and the confidence level with the data obtained using the position sensors. The method may further comprise a step of weighting of the confidence level on the basis of data from the position sensors.

The method thus makes it possible to obtain consolidated information items on the state of a locking system.

Naturally the invention is not limited to the embodiments described with reference to the figures and variants could be envisaged without going beyond the scope of the invention. Certain steps of the method could for example be reversed. Moreover, the confidence index could not be equal to 2, 1 or 0 but to a high value, a mid value or a low value.

The invention claimed is:

1. A method for monitoring a locking system comprising N locks, each lock being monitored by two locking sensors, each locking sensor being capable of indicating if the lock that the locking sensor monitors is in a locked or unlocked state, each locking sensor being able to be in a valid or invalid status, the method comprising:
- determining a state of the locking system on the basis of the state of each of the locks detected by the locking sensors;
- determining a reliability level associated with the state of the locking system on the basis of a number of valid locking sensors monitoring the locks that are in the same state as the locking system, wherein determining the state of the locking system comprises:
  - acquiring the status and the state of each locking sensor by a control unit;
  - determining an overall state and the status of each lock on the basis of the status and the state of the two locking sensors that monitor it;
  - determining the state of the locking system on the basis of the overall state of each lock.

2. The method for monitoring according to claim 1, wherein only the states of locks detected by valid locking sensors are used to determine the overall state of a lock.

3. The method for monitoring according to claim 1, wherein when the two locking sensors that monitor a same lock are invalid, an overall unlocked state is attributed to said lock.

4. The method for monitoring according to claim 1, wherein when the two locking sensors monitoring a same lock are valid but that the two locking sensors detect different states of that lock, the two locking sensors are considered invalid and an overall unlocked state is attributed to that lock.

5. The method for monitoring according to claim 1, further comprising determining a confidence index associated with the overall state of each lock, the confidence index being equal to a number of valid locking sensors that detect a state for the lock conforming to the overall state of the lock.

6. The method for monitoring according to claim 5, wherein the reliability level is determined by adding together the confidence indices associated with the overall states of locks that are in the same state as a surveillance system.

7. The method for monitoring according to claim 1, wherein the locking system is considered in a locked state when at least P locks are in an overall locked state.

8. The method for monitoring according to claim 1, wherein the locking system is considered in an unlocked state when at least Q locks are in an overall unlocked state.

9. The method for monitoring according to claim 7, wherein P is an integer greater than N/2.

10. The method for monitoring according to claim 8, wherein Q is an integer greater than N/2.

11. The method for monitoring according to claim 1, wherein the locking system is the locking system of a thrust reverser of a turbine engine.

* * * * *